INVENTOR.
Robert T. Wise,
BY Mahoney, Miller ATTY'S.
+ Rambo
by Wm. V. Miller

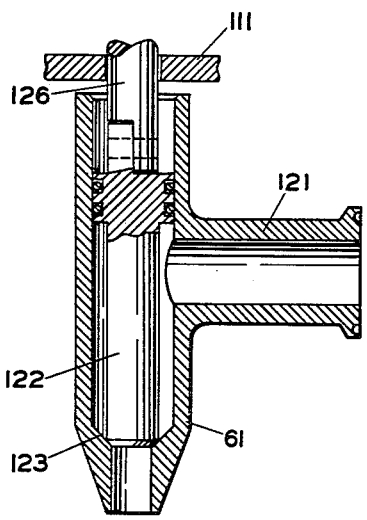
FIG. 3
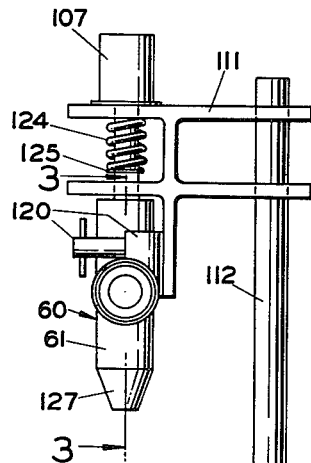
FIG. 2
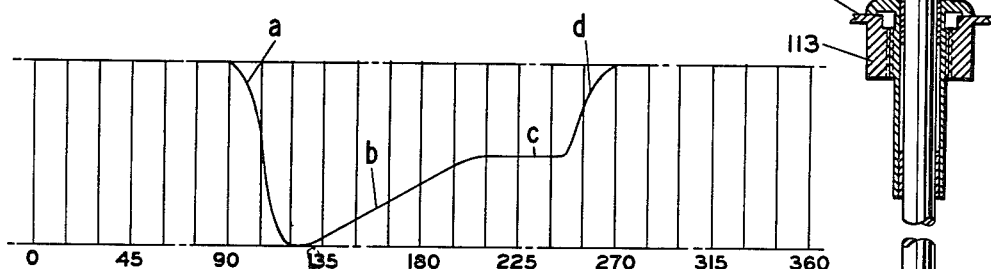
FIG. 4
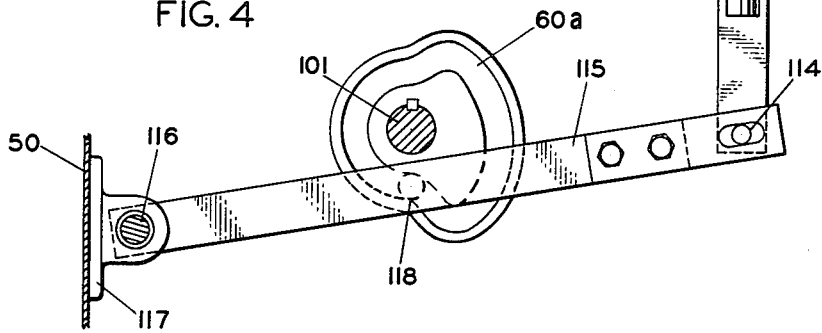

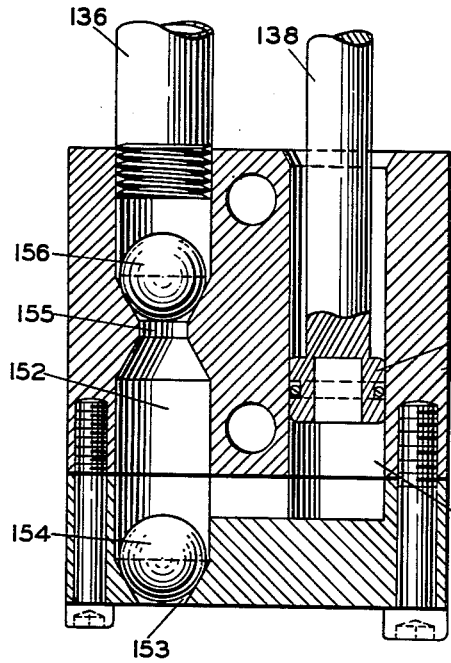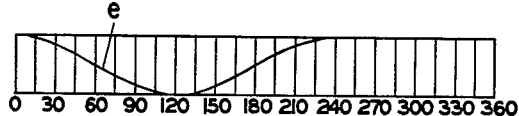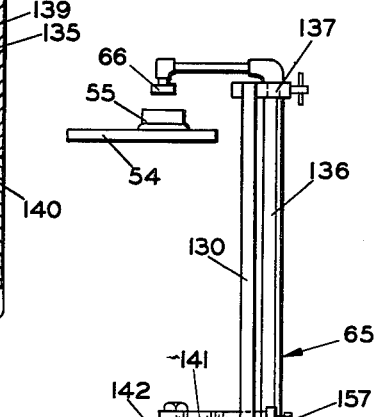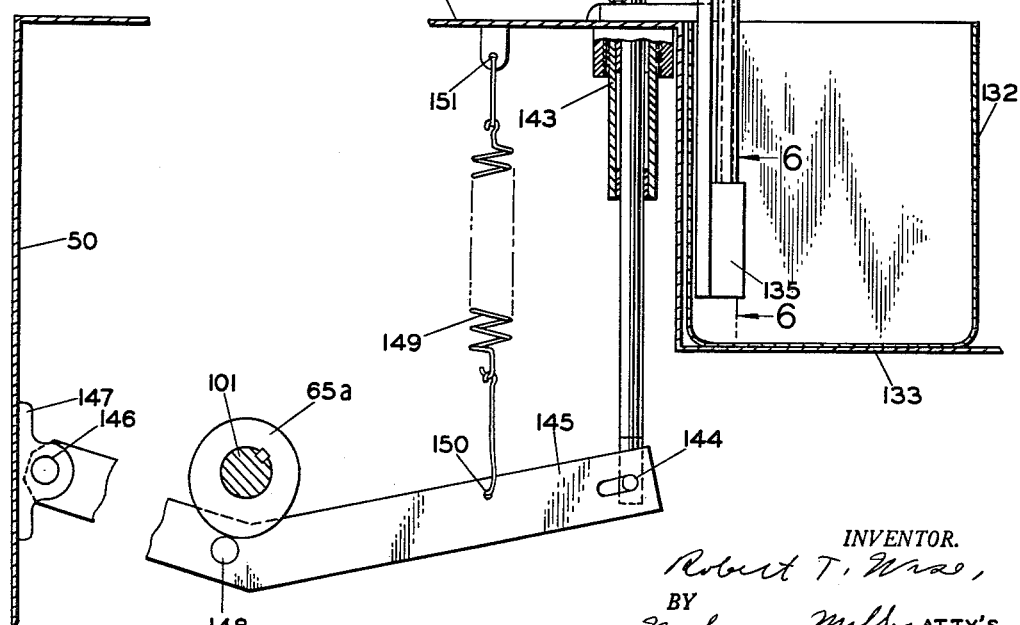

June 11, 1963 R. T. WISE 3,092,944
APPARATUS FOR FORMING AN EDIBLE ARTICLE AND
A PACKAGED ARTICLE PRODUCED THEREBY
Original Filed Sept. 3, 1957 10 Sheets-Sheet 7
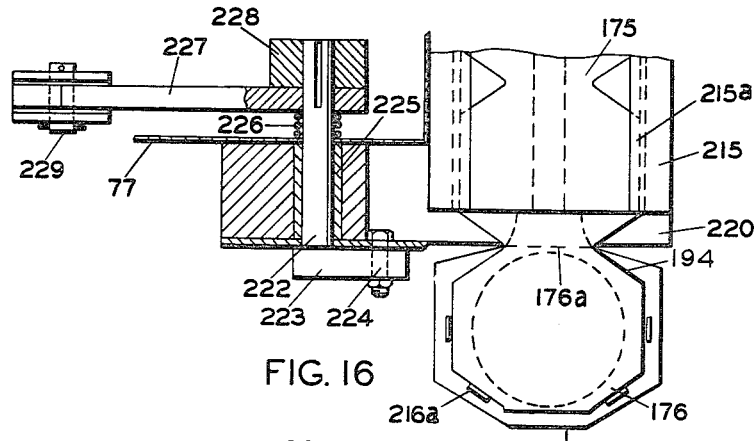
FIG. 16
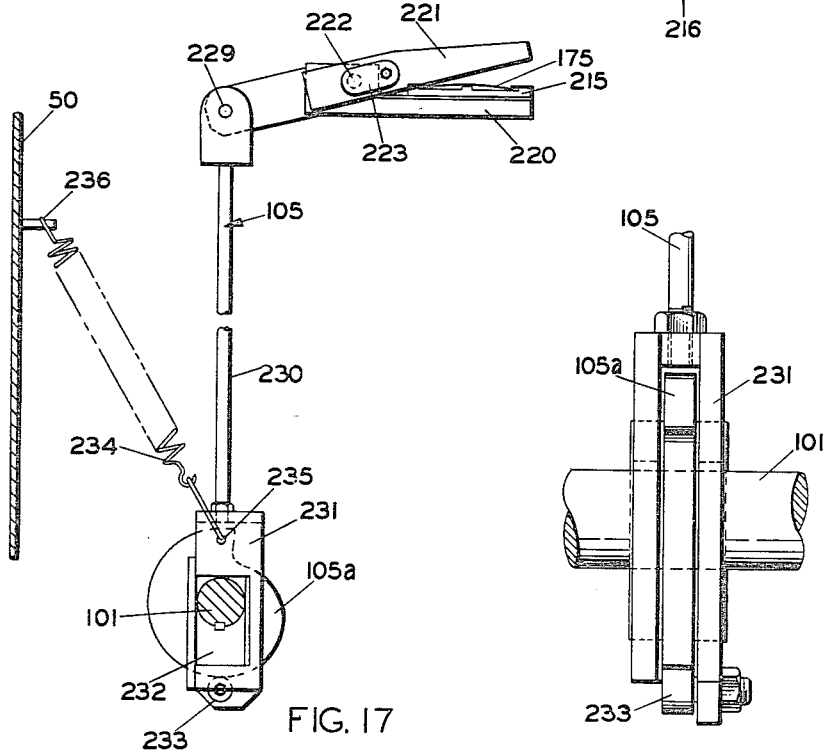
FIG. 17
FIG. 18
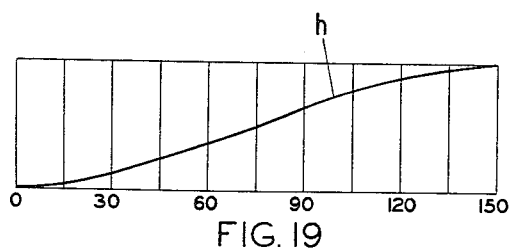
FIG. 19
INVENTOR.
Robert T. Wise
BY
Mahoney, Miller ATTY'S.
& Rambo
by Wm. V. Miller

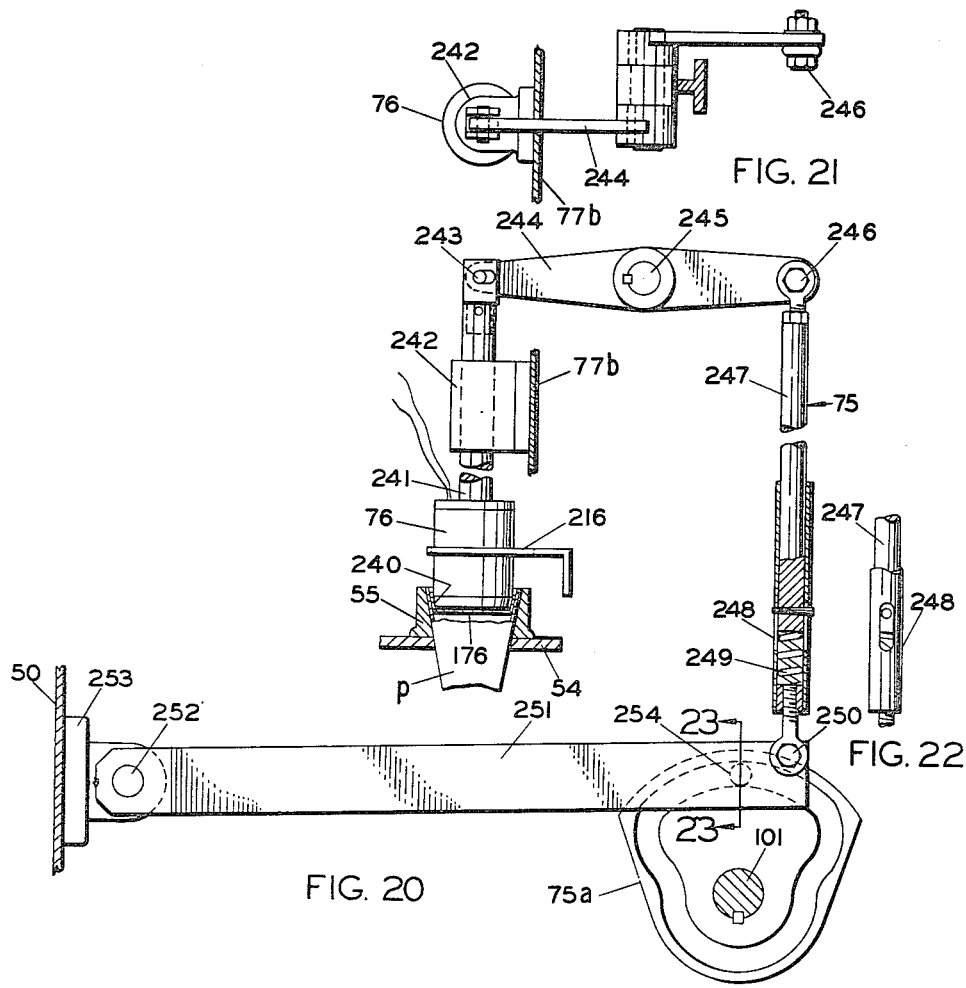
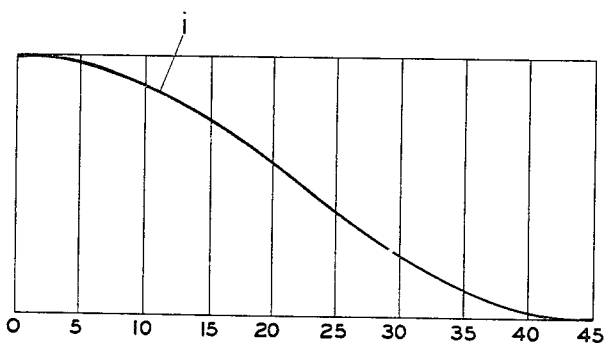
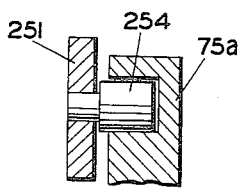

INVENTOR.
Robert T. Wise
BY Mahoney & Miller, ATTYS
BY Wm. V. Miller

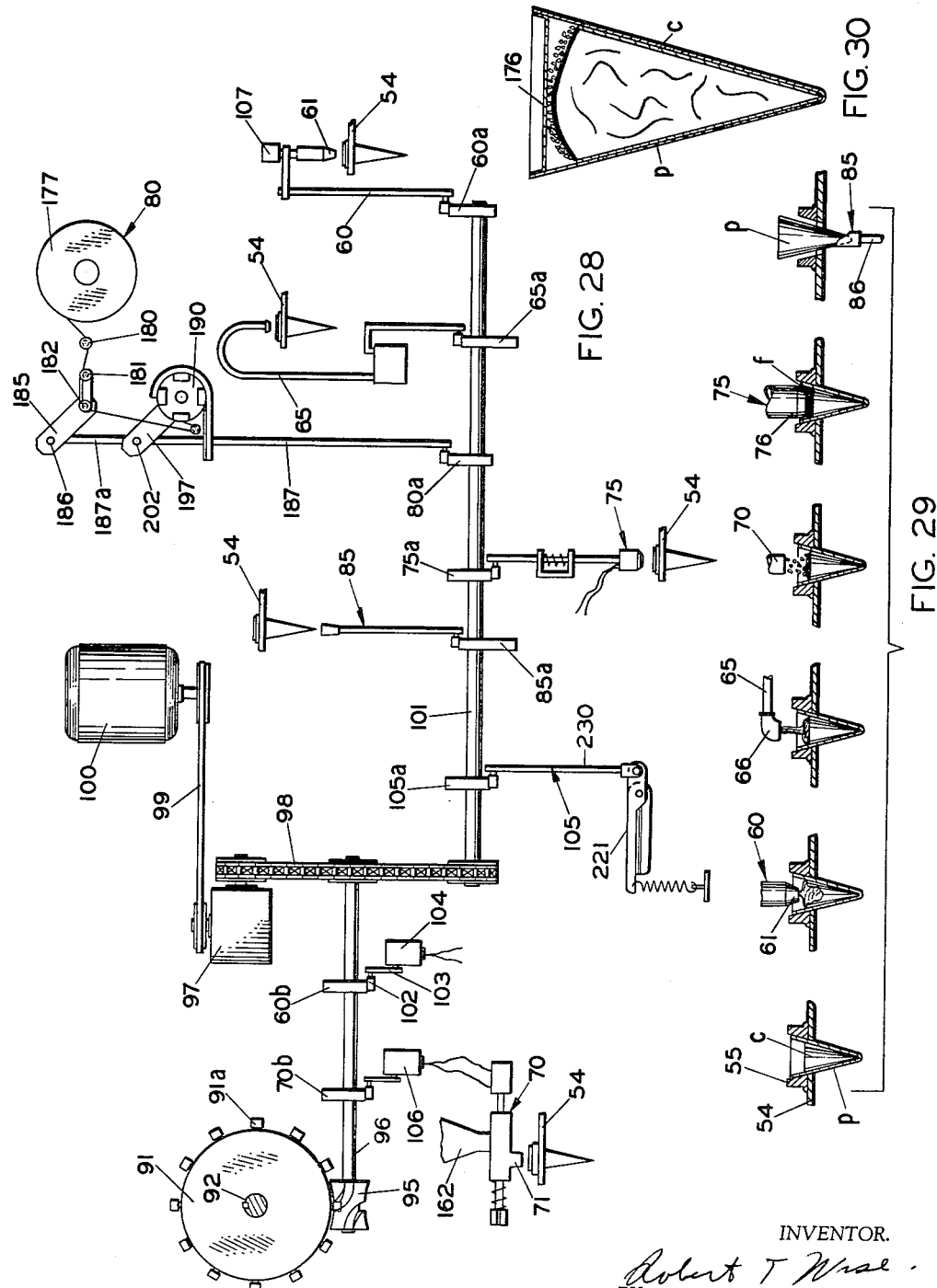

United States Patent Office 3,092,944
Patented June 11, 1963

3,092,944
APPARATUS FOR FORMING AN EDIBLE ARTICLE AND A PACKAGED ARTICLE PRODUCED THEREBY
Robert T. Wise, Columbus, Ohio, assignor to Big Drum, Inc., a corporation of Ohio
Original application Sept. 3, 1957, Ser. No. 681,538, now Patent No. 2,934,872, dated May 3, 1960. Divided and this application Mar. 24, 1960, Ser. No. 17,323
9 Claims. (Cl. 53—276)

This invention relates to an apparatus for forming an edible article and a packaged article produced thereby. It has to do, more particularly, with a process and machine for producing an edible cone article which consists of a sugar-rolled cone filled with ice cream and topped with chocolate and nuts. The process and machine also result in packaging of the article in a sanitary sealed package, the complete package being of novel form.

This application is a division of my copending application Serial No. 681,538, filed September 3, 1957, now Patent No. 2,934,872 issued May 3, 1960.

According to this invention, there is provided a machine which receives a series of articles in the form of an edible cone disposed within a protective cone of paper or other suitable material. The articles are loaded on the machine, which is of the turret type, and are then subjected automatically to a series of successive operations as intermittent rotation of the turret advances the articles. These operations include the filling of the paper enclosed edible cone with ice cream, the squirting of syrup on top of the ice cream, the deposit of nuts on the syrup covered top, the feeding of a cap of paper or other suitable protective material which is part of a continuous strip, into position over the top edge of the paper cone, the severing of the paper cap from the continuous strip, the sealing of the top of the paper cone with the severed cap, and the ejecting of the sealed package.

In the accompanying drawings, there is illustrated a machine capable of automatically performing the above-indicated operations to produce the desired article packaged in a sealed sanitary package.

In these drawings:

FIGURE 2 is a detail, mainly in side elevation, of the cone filling unit of the machine which serves to fill the cone with ice cream.

FIGURE 3 is a vertical sectional view taken along line 3—3 through the filling nozzle.

FIGURE 4 is a diagrammatic layout of the cam which operates the filling unit.

FIGURE 5 is a detail mainly in side elevation, of the unit which squirts syrup on the top of the ice cream in the cone.

FIGURE 6 is a vertical sectional view taken along line 6—6 of FIGURE 5 through the pump of the unit.

FIGURE 7 is a diagrammatic layout of the cam which operates the syrup pumping unit.

FIGURE 16 is a horizontal sectional view taken along line 16—16 of FIGURE 9 showing the means for shearing successive caps from the continuous paper cap strip.

FIGURE 17 is a side elevational view of the shearing unit for shearing successive caps from the continuous paper strip.

FIGURE 18 is an edge view of the operating cam and follower of the shearing unit of FIGURE 17.

FIGURE 19 is a diagrammatic layout of the operating cam for the shearing unit of FIGURE 17.

FIGURE 20 is a view, mainly in side elevation, of the sealing unit for sealing the paper caps within the upper ends of the paper cones.

FIGURE 21 is a plan view of the unit of FIGURE 20.

FIGURE 22 is a detail of the flexible joint in the connecting rod of the unit of FIGURE 20.

FIGURE 23 is a transverse sectional view taken along line 23—23 of FIGURE 20 showing the cam follower and associated cam of the unit of FIGURE 20.

FIGURE 24 is a diagrammatic layout of the cam for operating the unit of FIGURE 20.

FIGURE 28 is a schematic view of the driving mechanism of the machine and the various units of the machine along with the various means for operating such units successively in timed relationship.

FIGURE 29 is a schematic view illustrating the successive steps in the operation of the machine.

FIGURE 30 is a vertical sectional view through the filled sealed package.

Figure 1:
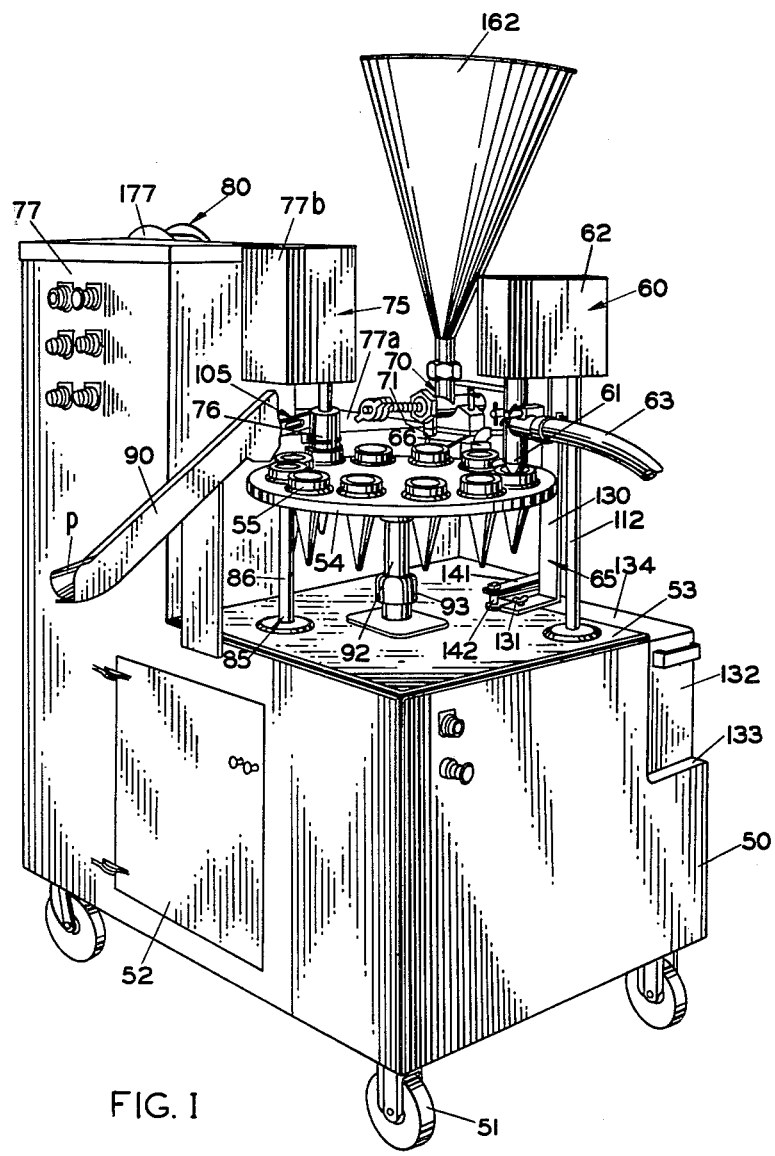
FIGURE 1 is a perspective view, partly broken away, of a machine of the turret type in which this invention is embodied.

With reference to the drawings, in FIGURE 1 there is illustrated the general arrangement of a machine in which this invention is embodied. This machine includes the housing 50 which is preferably supported by wheels 51 so that it is portable. An access door 52 is provided in the lower portion of the housing to permit access to the drive and other mechanism enclosed therewithin. The housing 50 is provided with a flat table top surface 53 and spaced above this surface 53 is the rotary turret 54. This turret 54 is a flat plate provided with a series of angularly spaced cone-receiving pockets 55.

Figure 8:
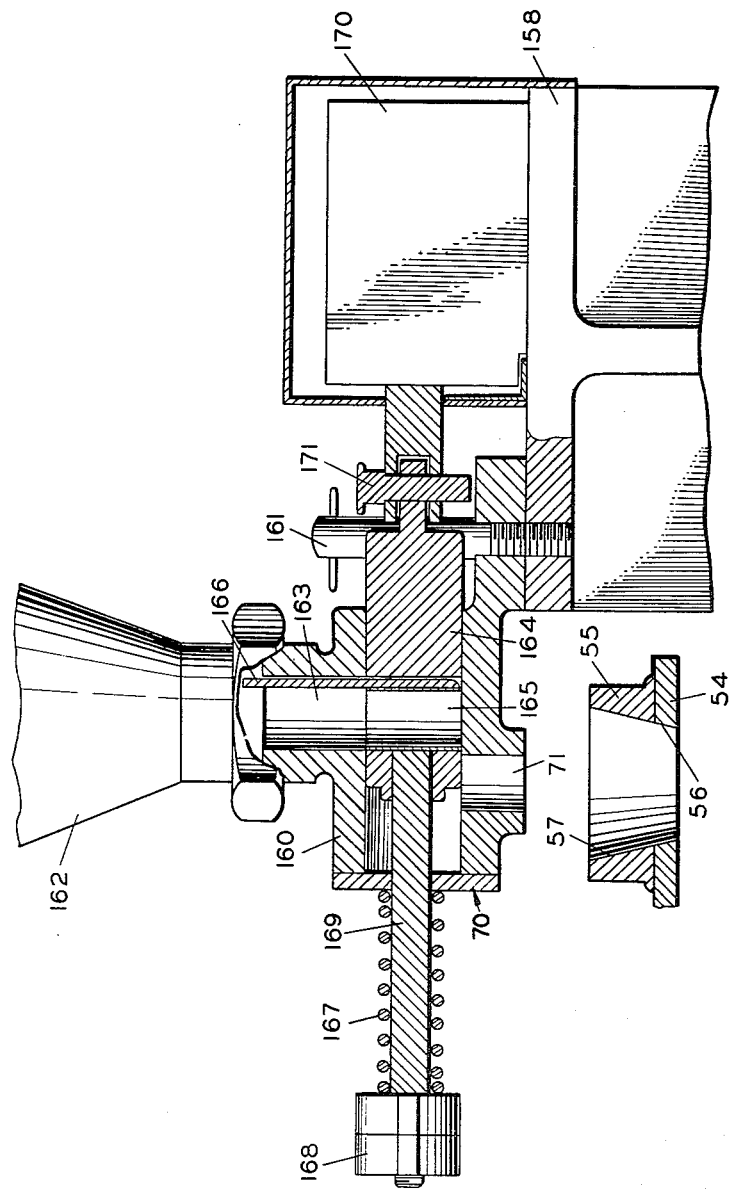
FIGURE 8 is a vertical sectional view through the unit which deposits a charge of nuts onto the syrup previously supplied on top of the ice cream.

One of these pockets is illustrated best in FIGURE 8 where it will be seen that the plate of the turret 54 is provided for each pocket with a beveled opening 56 and the pocket member 55 is fixed to the plate in alignment therewith. This pocket member 55 is provided with an inner surface 57 of frusto-conical form. One of these pockets 55 with a cone therein is shown in FIGURE 29. When a cone is positioned in the pocket 55, as indicated in FIGURE 29, it will rest downwardly within the upper edge of the pocket. The cones are initially loaded on the turret 54 manually and consist of an outer protective paper cone P and an inner edible cone C which rests within the paper cone and has its edge spaced from the upper edge of the paper cone, as shown in FIGURE 29.

The machine of this invention will perform automatically and successively as the turret 54 rotates step-by-step, the operations indicated diagrammatically in FIGURE 29.

The first operation is performed at the first station of the turret 54 which is rotated intermittently in a counter-clockwise direction with reference to FIGURE 1. This operation consists in filling the paper enclosed cake cone with ice cream by means of a unit 60 which has its nozzle 61 disposed at a predetermined and fixed position adjacent the periphery of the turret 54. This unit 60 includes a hood 62 disposed above the housing 50 and above the turret 54. The ice cream is supplied from a suitable source to the nozzle 61 by means of a hose 63 connected to the nozzle and leading from a suitable source of supply.

The next operation consists in squirting chocolate on top of the ice cream, as shown in FIGURE 29, by means of the unit 65 which has its nozzle 66 (FIGURE 1) located in a fixed position adjacent the periphery of the turret 54 over the path of movement of the pockets 55. The nozzle 66 is at the second station after the ice cream nozzle 61.

The third operation consists in supplying a charge of nuts to the chocolate covered top of the ice cream, as shown in FIGURE 29. The nuts are supplied by means of a unit 70 which has its discharge outlet 71 (FIGURE 1) disposed at the next station in the rotation of the turret 54.

The fourth operation consists in sealing a flanged paper cap F within the top of the paper cone P by means of a heating and sealing unit 75, as shown in FIGURE 29. The plunger 76 (FIGURE 1) of this unit is located two steps in the direction of rotation of the turret 54 beyond the station of the nut discharge outlet 71. The unit 75 is positioned in association with the upper end of the upstanding corner 77 of the housing 50. Also associated with the upper end of this part 77 of the housing is a unit 80 for supplying the paper caps.

The final operation is to eject the sealed package from the turret and this is accomplished, as shown in FIGURE 29, by means of an ejecting unit 85. The upwardly extending plunger 86 (FIGURE 1) of this unit is located at the second station beyond the sealing plunger 76. The plunger 86 extends upwardly from operating mechanism within the lower part of the housing 50. The plunger 86 will lift the packaged cone from the pocket 55 disposed above it in the turret 54 and will direct the sealed package into a discharge chute 90, which is disposed adjacent the housing corner portion 77 and extends downwardly and outwardly, as shown in FIGURE 1.

The mechanism for driving the turret 54 is disposed within the lower portion of the housing 50 and is illustrated diagrammatically in FIGURE 28. It consists of a standard type of intermittent drive which includes a driven disc 91 that is keyed to a vertical shaft 92. This shaft 92 is suitably mounted in bearings in the housing 50 and extends upwardly therefrom through the table top 53, where a seal 93 is associated therewith. Thus, when the disc 91 is rotated intermittently, the turret 54 is accordingly rotated intermittently.

The disc 91 is provided with a plurality of roller-type cam followers 91a at uniformly angularly spaced intervals on its circumference. These roller followers 91a cooperate with grooves in a barrel cam 95. This cam 95 is driven continuously but serves, through the medium of the grooves therein and the followers 91a, to rotate the disc 91 step-by-step in the usual way for this type of intermittent drive which is well-known in the art. The cam 95 is carried by a continuously driven shaft 96. This shaft is driven from a gear box 97 by means of a chain and sprocket drive 98. The gear box 97 is driven by a belt drive 99 from an electric motor 100. The chain and sprocket drive 98 also continuously drives a cam shaft 101 which has keyed thereto in axially spaced relationship a series of cams for operating various units of the machine. These cams include a cam 60a for operating the ice cream feeding unit 60, a cam 65a for operating the syrup squirting unit 65, a cam 80a for operating the paper cap strip feeding unit 80, a cam 75a for operating the sealing unit 75, a cam 85a for operating the cone-ejecting unit 85, and a cam 105a for actuating a cap shearing unit 105. Thus, unit 105, as will later appear and as shown in FIGURE 1, is located between the strip feeding unit 80 and the sealing unit 75. The continuously driven shaft 96 also carries switch-actuating discs keyed thereon for controlling certain units of the machine. As shown in FIGURE 28, each of these discs carries a finger 102 for engaging a switch lever 103. A disc 60b controls the switch 104 that actuates a solenoid-operated feed valve 107 of the ice cream feeding unit 60 and which is associated with the nozzle 61 thereof. A disc 70b controls the switch 106 that actuates a solenoid 170 of the nut-feeding unit 70.

The ice cream feeding unit 60 is shown best in FIGURES 1 to 4, inclusive. As previously indicated, the unit 60 includes the hood 62 which encloses the reciprocable head 111 of the unit, at a level above the turret 54. However, the hood 62 is removed from the head 111 in FIGURE 2. This head 111 is keyed on the upper end of a vertically disposed rod 112 which is mounted in a bearing 113 positioned in the upper wall 53 of the housing 50 for vertical reciprocation. The lower end of this rod 112 is connected by means of a pin and slot connection 114 to the outer end of a vertically swingable lever 115. This lever 115 is pivoted at its inner end at 116 to the bracket 117 that is attached to the wall of the housing 50 or to any other suitable vertical support. The lever 115 is disposed transversely of the cam shaft 101 and below such shaft and carries, substantially in alignment with the shaft, a cam follower roller 118. This roller 118 operates in a closed track in the cam 60a.

The head 111 has the nozzle 61 secured in depending relationship thereon by means of a suitable clamp 120. This nozzle 61 is vertically disposed and is provided with the inlet 121 leading laterally into it intermediate its height, this inlet 121 being coupled to the supply hose 63 previously mentioned. The solenoid-actuated valve 107 previously referred to, will control the flow of ice cream from the nozzle 61. This valve comprises a stem 122 which is coupled at its upper end to the core 126 of the solenoid and which has its lower end normally seated on the tapered seat 123, in the lower portion of the nozzle. The valve member 122 is normally seated by means of a compression spring 124 which is disposed between a collar 125 adjacent its upper end and a portion of the head 111. Normally, the solenoid is de-energized and the valve is closed. However, when the solenoid is energized, the valve member 122 is lifted, against the action of the spring 124, and permits flow of ice cream from the lower end of the nozzle 61, the nozzle being in lowered position within the cone at this time, the cone having been rotated by the turret 54 to a position directly below the nozzle. As the ice cream is flowing from the nozzle 61, the cam 60a will rotate to positively move the lever 115 and the rod 112 to raise the nozzle 61 from the cone. The valve 107 will be open long enough to permit the proper charge of ice cream to be deposited in the cone. The valve closes as the nozzle 61 withdraws from the cone. However, the track of the cam 60a is so shaped that just before the nozzle 61 is withdrawn from the cone, there is a slight pause as the flow of ice cream is shut off so as to produce a rounded convex surface on top of the cream. Then, the upwardly withdrawing motion of the nozzle 61 is continued.

The track of the cam 60a is of special shape to obtain the desired action as indicated by the diagrammatic layout in FIGURE 4. It will be noted from the curve of the diagram that there is a section *a* which indicates a quick lowering of the nozzle 61 into the cone, a section *b* which indicates a gradual withdrawal of the nozzle from the cone as the cone is being filled, a flattened section *c* which indicates a pause in the return movement of the nozzle as the cone is substantially filled and the flow of ice cream is interrupted, and a section *d* which indicates a quick continued withdrawal of the nozzle 61 to its highest position. Instead of positively lifting the valve member 122, the pressure of the ice cream entering through the inlet 121 may be used to lift it.

The syrup squirting unit 65 is shown best in FIGURES 1 and 5 to 7, inclusive. The nozzle 66 of the unit 65 is carried at the upper end of a vertically disposed support bar 130. This bar is clamped by means of a removable clamp 131 to the top 53 of the housing 50. It will be noted from FIGURES 1 and 5, that the housing 50 is recessed adjacent one side to provide for receiving a syrup tank or reservoir 132, this tank normally resting on a shelf 133 at the bottom of the recess. This tank 132 is normally closed by a lid 134 which fits around the bar 130 and associated parts.

The lower end of the bar 130 carries a pump housing 135. Extending upwardly from this housing 135 is a supply syrup tube 136 which is connected to the nozzle 66. This tube is clamped by a clamp 137 at its upper end to the upper end of the bar and its lower end threads into the housing 135, as shown in FIGURE 6. A pump actuating rod 138 carries a piston 139 on its lower end which is slidably mounted in a vertically disposed cylindrical chamber 140 formed in the housing 135. The upper end of this rod 138 is connected by a removable clamp bolt 157 to the outer end of an inwardly extending bar 141 which is attached rigidly to the upper end of an actuating rod 142. This rod 142 is slidably mounted in a bearing structure 143 which is mounted on the top wall 53 of the housing. The lower end of this rod 142 is pivotally connected by a pin and slot connection 144 to the outer end of a lever 145. This lever is pivoted at its opposite end at 146 to a bracket 147 which is attached to the wall of the housing 50 or to some other suitable support. The lever 145 is disposed transversely of and below the cam shaft 101 and intermediate its ends it is provided with a cam follower 148 in the form of a roller which engages the edge of the cam 65*a*. The lever 145 is normally lifted upwardly so that the roller 148 engages the edge of the cam 65*a* by means of a tension spring 149 which is connected to the outer end of the lever at 150 and to the upper wall 53 of the housing at 151. It will be apparent that rotation of the cam 65*a*, along with the action of the spring 149, will swing the lever 145 and move the plunger or piston 139 vertically in the chamber 140.

The chamber 140 communicates with a syrup charge chamber 152 in the housing 139. The lower end of this chamber 152 is provided with an inlet 153 for receiving syrup from the tank or reservoir 132. A downwardly seating ball check valve 154 is provided at this inlet 153. The chamber 152 is also provided with an outlet 155 and above this outlet is a downwardly seating ball check valve 156 which controls communication with the tube 136 which leads to the nozzle 66.

In the operation of this unit, the cam 65*a* on the cam shaft 101 will be rotating continuously and is so shaped that there will be a gradual up and down movement of the lever 145, as indicated by the sine curve *e* of FIGURE 7, which will produce a gradual downward and upward movement of the rod 138 which will similarly actuate the plunger 139. Downward movement of the plunger 139 will force syrup from the chambers 140 and 152 into the tube 136, the valve 154 seating and the valve 156 unseating. Thus, a predetermined charge of syrup will be supplied to the nozzle 66. Upon upward movement of the plunger 139, suction will be created which will seat the valve 156 and unseat the valve 154, drawing a charge of syrup into the chambers 152 and 140 from the tank 132. Thus, a squirt of syrup will be supplied to the top surface of the ice cream in the cone C, as indicated in FIGURE 29.

The entire unit 65 may be quickly removed from the housing 53 by releasing the clamping means 131 and 157. This will permit removal of the tank 132 and all associated parts for cleaning.

The nut feeding unit is shown best in FIGURES 1 and 8. The discharge outlet 71 thereof is at the lower side of a charge accumulating and feeding cylinder 160 which is clamped, by a removable clamp 161, to a support 158 which is attached to an extension 77*a* of the housing (FIGURE 1) which is at a lower level than the extension 77 and is behind it. A hopper 162 for nuts is carried on the upper side of the cylinder 160 and the cylinder is provided with an inlet 163 communicating with the lower end of the hopper. Within the cylinder 160 is a piston 164 mounted for horizontal reciprocating movement. This cylinder is provided with a vertically disposed pocket 165 open at its upper and lower ends and normally being aligned with the outlet 71. With the bottom of the pocket 165 closed by the lower wall of the cylinder 160 and the top communicating with the inlet 163, as shown in FIGURE 8, a charge of nuts will drop from the hopper into the pocket. The cylinder 160 has its discharge outlet 71 so located that when the piston 164 is moved to the left, the pocket 165 will align therewith and the cylinder will substantially close the inlet 163. The charge accumulated in the pocket 165 will drop through the outlet 71. Upstanding from the pocket 165 is an agitating finger 166 which will move with the piston 164 and will agitate nuts in the outlet 163 to prevent jamming therein.

The piston 164 is normally held to the left of FIGURE 8 by means of a compression spring 167 which is disposed around the piston rod 169 between the outer end of the cylinder 160 and the lock nuts 168 on the threaded outer end of the piston rod. However, the piston is moved to the right to the position indicated in FIGURE 8 by energizing a solenoid 170, which is connected to the opposite end of the piston 164 by means of a removable coupling 171. As previously indicated, this solenoid 170 is controlled by the switch 106 of FIGURE 28. When the solenoid 170 is energized, the cylinder 164 is pulled to the right, a charge of nuts will drop into the pocket 165 and when it subsequently is moved to the right by the spring 167 upon deenergization of the solenoid, the pocket 165 will move over the outlet 71 and drop the charge of nuts therethrough.

The paper cap strip feeding unit 80 is indicated in FIGURE 1 and is shown in detail in FIGURES 9 to 15, inclusive. The caps are in the form of a continuous strip 175 of individual caps 176 which are joined together. The shape of these individual caps 176 is illustrated best in FIGURE 16 in which it will be noted that they are of octagonal outline. The strip 175 is rolled on a spool 177 which is removably mounted on a freely rotatable shaft 178 that extends rearwardly from the rear wall 179 of the housing 77, as viewed in FIGURE 1. From the spool 177, the paper strip 175 feeds beneath an idler roller 180 which also projects rearwardly from the rear wall 179 of the housing 77. The strip 175 then extends into association with an idler roller 181 which is one roller of a double roller unit 188 that also includes the roller 182 axially spaced therefrom.

The roller unit 188 (FIGURE 13) comprising the rollers 181 and 182 is mounted for rocking movement about the axis of a shaft 183, being keyed to that shaft, the axis of the shaft coinciding with the axis of the roller 182. The shaft 183 is mounted for rotation in a bearing 184 extending inwardly from the wall 179. The inner end of this shaft has keyed thereon a rocking lever 185.

The outer end of this lever 185 is pivoted at 186 to an actuating rod 187a, which is moved vertically by means to be later explained. Swinging of the roller unit 188 upwardly counterclockwise (FIGURE 10) about the axis of the shaft 183 will pull a sufficient amount of the strip 175 from the spool 177 to provide sufficient slack in the strip for subsequent feeding of the strip in the manner indicated below.

From the roller unit 188 the strip 175 passes in front of and then upwardly around an idler roller 189 which is carried on the wall 179. The strip then passes around a feed roller 190. This feed roller 190 is carried by a shaft 191 which is rotatably mounted in a bearing 192 on the wall 179. The surface of the roller 190 is provided at proper angularly spaced intervals with opposed inwardly directed pointed lugs 193, which engage with the opposed V-notches 194 that are formed in the strip 175 where adjacent caps 176 are joined. Thus, the feed roller 190 will exert a pull on the strip but the roller unit 188 will always maintain slack in the strip to prevent tearing by the feed roller since, as previously indicated, rocking of the roller unit 188 will unwind a predetermined amount of the strip from the freely rotatable spool 177.

The feed roller 190 is advanced step-by-step to feed the paper strip 175 each time through a distance equal to the length of one of the caps 176. This is accomplished by means of the ratchet mechanism illustrated best in FIGURES 9, 12, and 14. This ratchet mechanism comprises a ratchet 195 loosely mounted on the shaft 191 and associated with a pawl 196 which is pivoted to a rocking lever 197, and is held in engagement with the ratchet by a spring 211. The lever 197 is rotatably mounted by means of the bearing 198 on the shaft 191 next to the ratchet 195. Adjacent the ratchet, a friction brake 199 is provided in association with a sleeve 201 at the inner end of the shaft 191 and this brake is supported by means of a pin 200 rigidly carried by the wall 179 and projecting inwardly therefrom. The sleeve 201 is keyed to the shaft 191 and is fixed to the ratchet 195.

The rocking lever 197 has its outer end pivotally connected at 202 to the vertically movable actuating rod 187. This rod 187 (FIGURE 9) is pulled upwardly by means of a spring 203 attached at its lower end to the rod, as indicated at 204, and at its upper end to a part of the housing wall 77a, as indicated at 205. The lower end of the rod 187 is pivoted by a pin and slot connection 206 to the outer end of a lever 207 which has its inner end pivoted at 208 to a bracket 209 attached to the bottom of the housing 50. Intermediate its ends, the lever 207 carries a cam follower in the form of a roller 210 which engages the edge of the actuating cam 80a. This cam is keyed on the cam shaft 101 (FIGURE 28) and the lever 207 is disposed below and transversely of the shaft. The spring 203 maintains the follower 210 in contact with the cam. The action of the cam 80a is illustrated by the curve in FIGURE 15 which has an abrupt upwardly extending section f and a gradual declining section g, which illustrate a quick upward or return stroke of the actuating rod 187 and a gradual downward or feed stroke (FIGURE 28) which actuates the lever 197 to cause the ratchet 195 to advance the feed wheel 190 one step. The rod 187a extends downwardly from the pivot 186 so that when the rod 187 is moved vertically the rod 187a is also moved vertically and thereby the actuating lever 185 is swung simultaneously with swinging of the lever 197 to swing the roller unit 188 and pull a predetermined amount of the strip 175 from the spool 177.

Figure 10:
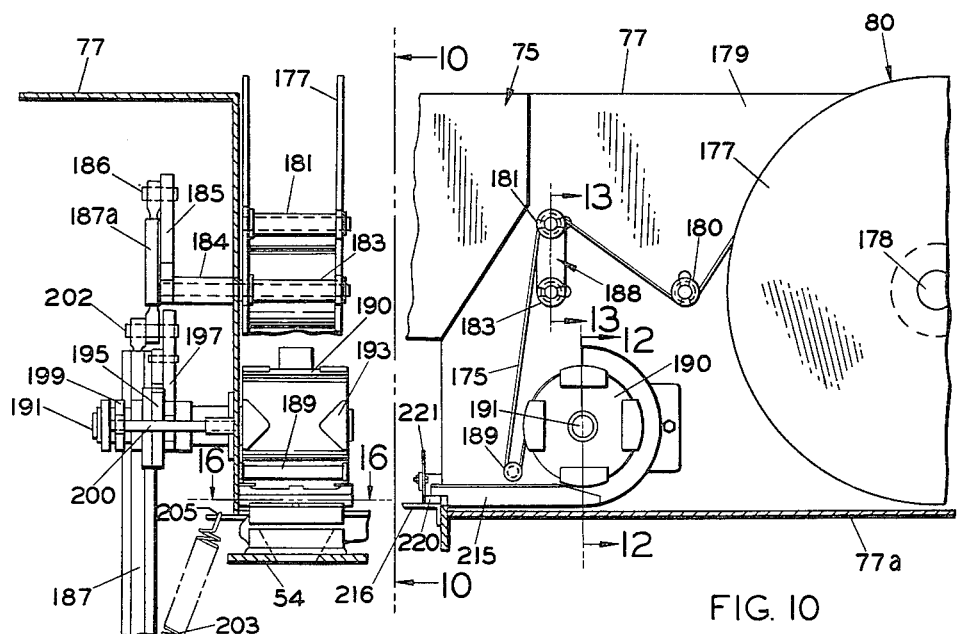
FIGURE 10 is a view, mainly in side elevation and taken along line 10—10 of FIGURE 9, of the paper cap strip feeding unit.
Figure 11:
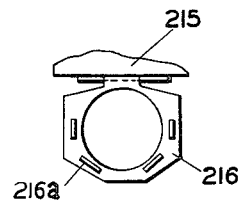
FIGURE 11 is a plan view of a guide and flanger for the paper cap.
Figure 9:
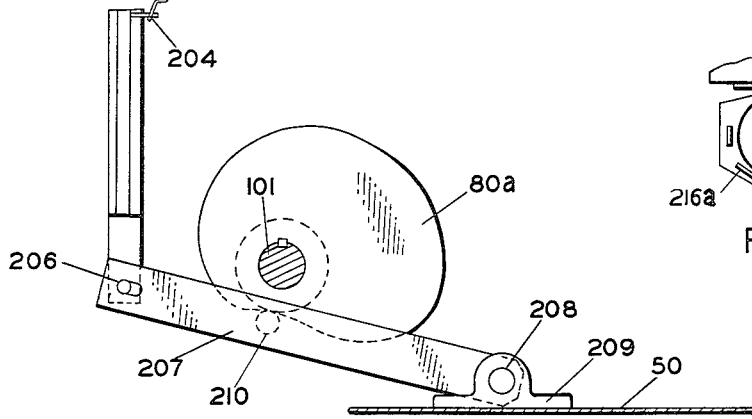
FIGURE 9 is a view partly in side elevation and partly in vertical section of the feeding unit for feeding the continuous strip of paper caps into position to be applied to the cones.
Figure 12:
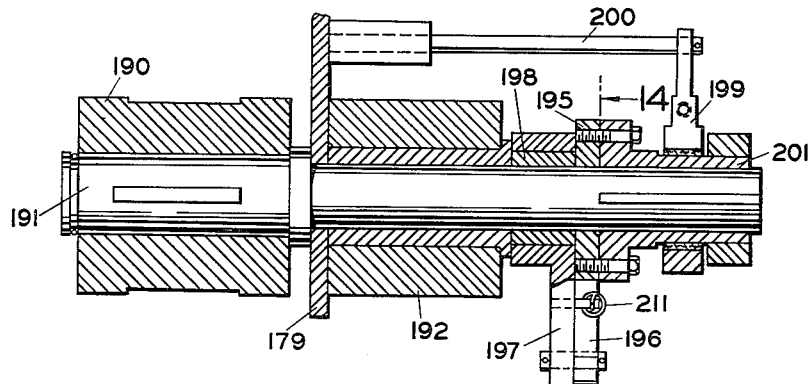
FIGURE 12 is a vertical sectional view taken along line 12—12 of FIGURE 10 through the ratchet means of the paper cap strip feeding unit.
Figure 13:
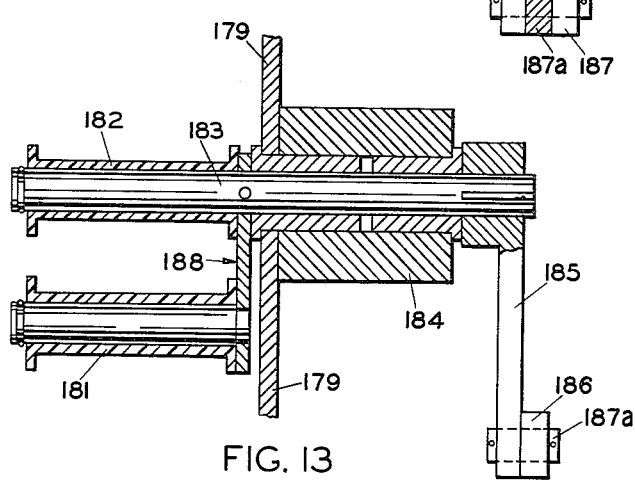
FIGURE 13 is a vertical sectional view taken along line 13—13 of FIGURE 10 through the swingable feed roller mechanism of the paper cap strip feeding unit.
Figure 15:
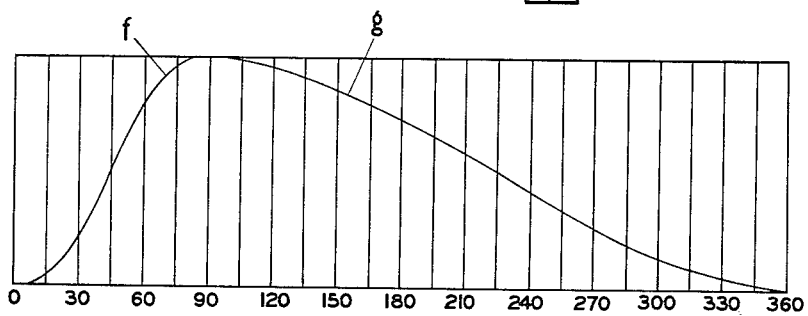
FIGURE 15 is a diagrammatic layout of the cam which operates the paper cap strip feeding unit.
Figure 14:
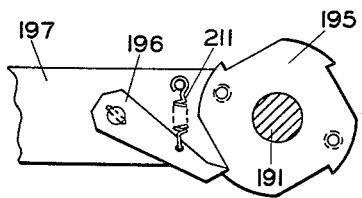
FIGURE 14 is a vertical sectional view taken along line 14—14 of FIGURE 12 through the ratchet means of the paper cap strip feeding unit.
Figure 25:
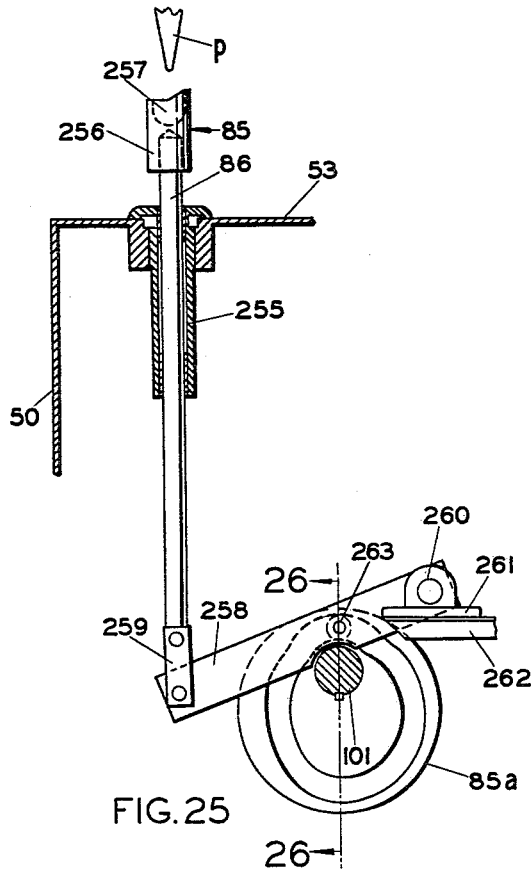
FIGURE 25 is a view, mainly in side elevation, of the ejecting unit for ejecting the packaged cones.
Figure 26:
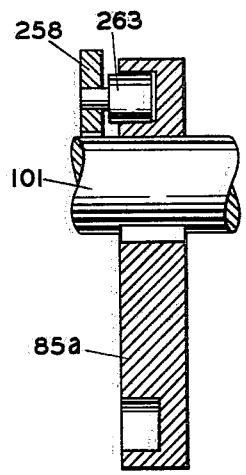
FIGURE 26 is a vertical sectional view taken along line 26—26 of FIGURE 25.

Associated with the feed roller 190 is a guide member 215 which is of J-form, being attached to the wall 179 and having its curved semi-cylindrical part around the roller 190 at the side opposite to where the roller 189 is disposed, as indicated in FIGURE 10. The horizontal part of this guide extends into association with a vertical cap guide and flanger 216 which is disposed at the edge of the housing section 77a. The shape of this member 216 is illustrated in FIGURES 11 and 16 where it will be seen that it is provided with a circular opening and is further provided with upstanding locating lugs 216a which will be disposed adjacent flat cooperating edges of the cap 176. The horizontal part of the guide 215 converges slightly as indicated by broken lines 215a in FIGURE 16, to such width that it will slightly arch the strip of paper transversely, as shown in FIGURE 17. As will be apparent later, this arching of the strip will aid in the shearing of the successive caps from the strip.

The shearing unit for shearing off successive caps 176 from the strip 175 is shown best in FIGURES 1, 16 to 19, and 28. It includes a fixed shearing blade or ledge 220 which is formed at the outer end of the guide 215. Pivoted to the outer end of the guide 215 is the removable rockable shearing blade 221. This blade 221 is pivoted for vertical swinging movement directly in front of the ledge 220 and it will be noted in FIGURE 10 that the guide and plunger member 216 is at a lower level to permit this. This blade 221 is provided with an opening which receives the pivot pin 222 that has a blade attaching block 223 on its outer end against which the blade is disposed and which is bolted thereto by a bolt 224. The pin 222 is rotatably mounted in a bearing 225 on the wall of the housing section 77, and a compression spring 226 is provided around the pin between such wall and a rock arm 227 for keeping the blade in contact with the face of the ledge 220 during the shearing action. The rock arm 227 is splined on the inner end of the pin 222 and is held in place by a removable spline nut 228. This structure will permit removal and replacement of the blade 221. The outer end of the rock arm 227 is pivoted at 229 to the upper end of the actuating rod 230. This rod 230 carries on its lower end a yoke 231 which straddles the cam 105a that is keyed to the cam shaft 101. The yoke is provided with vertical slots 232 in its sides which receive the shaft 101 and permit vertical movement of the yoke relative to the shaft. The lower side of the yoke carries a cam follower in the form of a roller 233 which engages the lower edge of the cam 105a. A tension spring 234 has its lower end connected to the yoke 231 at 235 and its upper end connected at 236 to the wall of the housing 50. This spring 234 will keep the follower 233 in contact with the edge of the cam.

As the cam 105a rotates, it will move the rod 230 vertically to actuate the movable shearing blade 221. As indicated by the curve h in FIGURE 19, the cam will gradually move the blade 221 into shearing position. At the time it shears the cap 176 from the strip 175, the joint between successive caps, indicated by the broken line 176a in FIGURE 16, will be at the edge of the ledge 220.

The severed cap will drop onto the guide and flanger 216 which, as indicated in FIGURE 10, is at a slightly lower level than the shearing ledge 220, as shown in FIGURE 10. While on this ledge, the severed cap will be engaged by the sealing plunger 76 of the sealing unit 75. The strip of caps 175 is formed of paper coated with a plastic substance which, when heated, will adhere to the paper cone P. Therefore, the plunger 76 not only is designed to force the cap downwardly through the guide and flanger 216 but will also heat it at the same time.

The heating and sealing unit 75 is shown best in FIGURES 1, 20 to 24, and 28. Part of the mechanism of this unit is enclosed within a housing 77b (FIGURE 1) attached to the upper portion of the housing section 77. This unit comprises the plunger 76 which is provided with electric heating means. The plunger has a tapered lower end 240 which will cooperate with the guide and flanger 216 to properly shape the severed cap 176 to fit within the upper end of the paper cone P. When moved downwardly, the plunger will extend through the ring-shaped guide 216 into the cone P located below the guide 216. The flanged cap 176 will be pushed through the guide 216, by means of the plunger 76 passing through it, and will be positioned within the upper end of the paper cone P as shown in FIGURE 29. The plunger will heat the paper cap 176, and especially the flange thereof, to cause it to adhere within the paper cone P.

The plunger 76 is carried on the lower end of a plunger rod 241 which is mounted for vertical sliding movement in a bearing 242 attached to the housing section 77b. The upper end of this rod 241 is connected by a pin and slot connection 243 to the outer end of a lever 244 from which the plunger is suspended. This lever is fulcrumed intermediate its ends by means of a shaft 245 which is mounted on the housing 77b. The opposite end of this lever 244 is pivotally connected at 246 to the upper end of an actuating rod 247. This rod is provided with a telescoping flexible joint 248 at its lower end which includes a spring 249 that normally keeps the rod extended but which is capable of yielding when necessary. The lower end of the rod is pivotally connected at 250 to the outer end of a cam lever 251 which is pivoted at its inner end at 252 to a bracket 253 which is attached to the wall of the housing 50. Adjacent its outer end, the lever 251 carries a cam follower in the form of a roller 254 which operates in a closed cam track in the cam 75a. The cam 75a is keyed to the cam shaft 101 and is so shaped that during its rotation there will be a gradual downward movement of the plunger 76, as indicated by the curve i in FIGURE 24. As the plunger 76 positions the cap 176 in the upper end of the paper cone P, the bevel 240 thereon will press the flange of the cap against the side of the cone P within which it is seated, as shown in FIGURE 29. The heated plunger will heat the cap flange sufficiently so that it will adhere to the cone. The flexible joint 248 will insure proper contact of the cap and cone since it will yield to permit the plunger to tightly press the flange of the cap against the wall of the cone.

The completed article sealed in the package, as previously indicated, is ejected from the turret 54 by means of the unit 85. This unit is illustrated best in FIGURES 1, 25 to 27, and 28. It comprises the plunger 86, previously mentioned, which is mounted for vertical sliding movement in a bearing 255 which is mounted in the upper wall 53 of the housing 50. As previously indicated, the plunger will move upwardly under the turret. The upper end of the plunger is provided with a fitting 256 which has a shallow socket 257 having a curved bottom formed therein that has a wall higher on its inner side than on its outer side. Therefore, when this socket 257 engages the lower end of the cone P, the cone will rock outwardly from the socket, as shown in FIGURE 29. The cone will be tilted and directed outwardly into the upper end of the discharge chute 90.

For actuating the plunger 86, that is, for moving it vertically, the lower end thereof is connected to a cam lever 258 by means of a pivoted link 259. This lever extends transversely above the shaft 101 and its inner end is pivoted at 260 to a bracket 261 which is attached to a suitable support 262 carried by the housing 50. Intermediate its ends, this lever 258 carries a cam follower in the form of a roller 263 which operates in a closed track formed in the cam 85a which is keyed to the shaft 101. The cam 85a will move the rod 86 vertically and perform the ejecting operation, as previously indicated.

Figure 27:
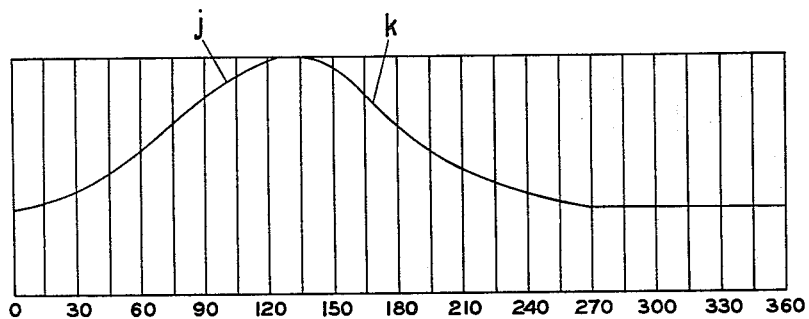
FIGURE 27 is a diagrammatic layout of the cam used for operating the ejecting unit of FIGURE 25.

As indicated by the curve in FIGURE 27, the cam will quickly raise the rod 86 and gradually lower it in performing the ejecting operation. Thus, the sharp upwardly inclined curve section j indicates the quick raising of the rod and the gradually downwardly inclined section k indicates the gradual lowering of the rod.

The operation of the various units of the machine has been described above and a detailed description of the operation need not be repeated at this point. However, it will be apparent that each successive operation will be performed at the proper interval, as the turret 54 rotates to its successive stations. This is accomplished by having the cams on the cam shaft properly related to each other, as indicated by the graphs of the cams, along with the relationship of the switch-operating discs thereto.

The filled and topped edible cone in the sealed protective cone is illustrated in FIGURE 30. It will be noted that the convexly curved upper end on the cream is retained even after the paper cap 176 is positioned and sealed within the upper end of the paper cone P since downward movement of the sealing plunger 76 is limited. The syrup follows down along the curve and the syrup and nuts cover the entire convex surface. After the package is sealed, it is placed in a hardening room where the reduced temperature will solidify the ice cream and the syrup. The product is thereafter maintained at low temperature until consumed.

Although it is stated that the cone P and the cap 176 are of paper, it is to be understood that they may be of other material such as foil, plastic, etc., but their cooperating surfaces must be capable of being sealed by heat. Also, the material for the caps should be in continuous strip form.

Having thus described this invention, what is claimed is:

1. Apparatus for producing an article in a sealed protective package comprising a rotatable support having a series of angularly spaced pockets for receiving and supporting hollow package bodies each having an open mouth with the mouth upright, means for rotating said support intermittently so as to move said package to successive stations arranged angularly of said support, means at one of said successive stations for almost filling the package but allowing a sealing surface at the mouth edge of the package on its inner surface, said filling means comprising means for supplying a plastic material into the body and means for interrupting the filling operation and simultaneously forming a convex surface on the plastic material, and means at another of said stations for forming a cap with an upright flange and a central disc and inserting it in said package while simultaneously sealing it to said package sealing surface with the disc tangential to said convex surface.

2. Apparatus for producing an edible article in a sealed protective package comprising a rotatable turret having a series of angularly spaced pockets for receiving protective packages in the form of cones of protective material with their mouths upright, each of the protective cones having a complemental edible cone therein with its mouth upright and with its edge spaced slightly below the mouth edge of the protective cone so that an inner annular sealing surface of the protective cone is exposed, means for rotating the turret intermittently to cause each pocket with the supported protective cone to move to successive stations angularly disposed relative to said turret, means at one of said stations to fill the edible hollow cone substantially to its upper mouth edge with edible material in plastic condition, means at a subsequent station for forming a cap of flexible material in the form of a disc having an upstanding peripheral flange and for inserting the flanged cap into the mouth of the protective cone with the disc above the plastic material in the edible cone and with the flange surface in contact with said sealing surface of the protective cone and for sealing such surfaces together, said filling means comprising a nozzle, means for lowering the nozzle into the edible cone and withdrawing it therefrom as the plastic material in the form of ice cream flows thereinto and for producing a pause in the withdrawal movement of the nozzle as the cone is filled, and means for interrupting flow of ice cream at the pause.

3. Apparatus according to claim 2 in which the forming and sealing unit includes a heated plunger which heat seals said surfaces and a circular guide which cooperates with said plunger.

4. Apparatus according to claim 3 including plunger means at a subsequent station for engaging the lower end of the protective cone to eject the sealed package from the turret.

5. Apparatus according to claim 3 including means at a station after the filling station for squirting syrup on the ice cream surface, said means comprising a pump, and means for actuating the pump.

6. Apparatus according to claim 5 including means at a subsequent station to measure and deposit a charge of nuts on the syrup coated surface of the ice cream.

7. Apparatus according to claim 6 including means for timing the operation of all of said means at the successive stations in relationship to the intermittent movement of the turret, said means including rotatable timing shafts, and means for driving said shafts and said turret rotating means.

8. Apparatus according to claim 7 in which one of said shafts carries cams for actuating said filling nozzle, said syrup pump, said forming plunger and said ejecting plunger.

9. Apparatus according to claim 8 in which the nut measuring and depositing means is provided with an electric control, said forming unit including a shearing device for shearing successive caps from a continuous strip and said filling means being provided with an electric control, one of said shafts carrying means for operating both of said electric controls.

References Cited in the file of this patent
UNITED STATES PATENTS

| | | |
|---|---|---|
| 905,203 | Matthias | Dec. 1, 1908 |
| 1,931,246 | Barbieri | Oct. 17, 1933 |
| 2,032,040 | Barrett | Feb. 25, 1936 |
| 2,199,754 | Penrod | May 7, 1940 |
| 2,206,267 | Schulz et al. | July 2, 1940 |
| 2,427,712 | Casler et al. | Sept. 23, 1947 |
| 2,558,251 | Holsted | June 26, 1951 |
| 2,598,137 | Schulz et al. | May 27, 1952 |
| 2,662,498 | Jonsson | Dec. 15, 1953 |
| 2,743,959 | Nelson et al. | May 1, 1956 |
| 2,863,271 | Anderson et al. | Dec. 9, 1958 |
| 2,909,878 | Shiu | Oct. 27, 1959 |
| 2,920,431 | Izumi | Jan. 12, 1960 |
| 2,925,347 | Cummings et al. | Feb. 16, 1960 |
| 2,972,216 | Schmidt | Feb. 21, 1961 |
| 2,982,074 | Shiu | May 2, 1961 |